Dec. 18, 1923.
A. E. ROUVIER
1,478,257
BRAKE FOR AUTOMOBILES
Filed July 11, 1921
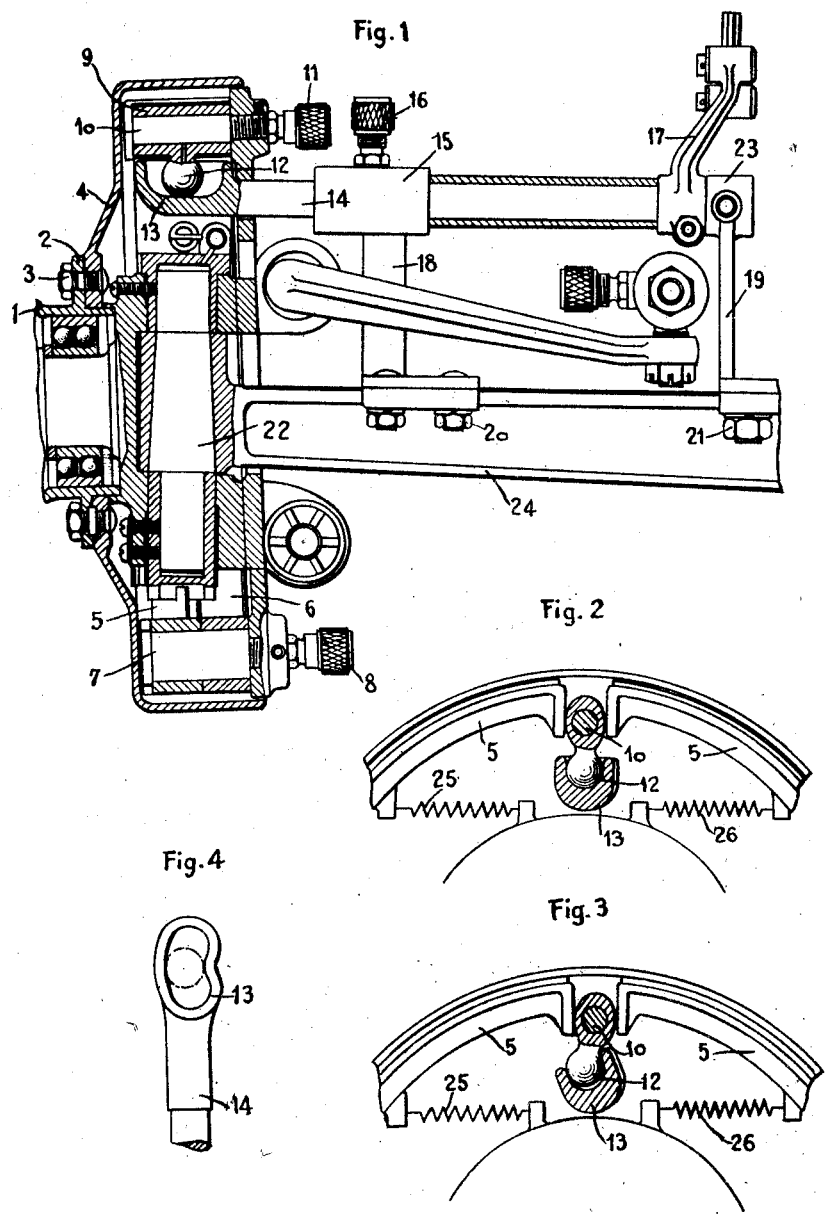
Inventor
a. Elizalde Rouvier
by
W. E. Evans
Attorney.

Patented Dec. 18, 1923.

1,478,257

UNITED STATES PATENT OFFICE.

ARTURO ELIZALDE ROUVIER, OF BARCELONA, SPAIN.

BRAKE FOR AUTOMOBILES.

Application July 11, 1921. Serial No. 483,890.

*To all whom it may concern:*

Be it known that I, ARTURO ELIZALDE ROUVIER, a subject of the King of Spain, residing at No. 149 Paseo de San Juan, Barcelona, Spain, have invented certain new and useful Improvements Relating to Brakes for Automobiles, of which the following is a specification.

The object of the present invention is an operating mechanism for the brakes of driving wheels capable of being applied particularly to automobiles and other vehicles whose front wheels are driving wheels.

The mechanism is designed in such manner that the operation of the brakes for the front wheels can be effected with every certainty no matter what the positions of the wheels may be as the result of change of direction of the vehicle.

The mechanism in question is characterized by the disposition of a lever connected to the cam which applies pressure to the brake segments of each brake, which lever is operated by an oscillating pressure applying member controlled by the driver, this pressure applying member and the cam lever being suitably disposed so that the lever remains free for effecting the circular movement which is necessary by reason of the movements resulting from the change of direction of the front wheels while remaining always in contact with the pressure applying element during the application of the brake.

In the accompanying drawing is represented by way of example one constructural form of brake mechanism constructed according to the invention.

Figure 1 is a vertical section showing the brake as well as part of the respective elements of the front wheel to which the brake is applied.

Figure 2 is a front detail view of the elements essential to the application of the brake which are disposed in the normal position.

Figure 3 is a similar view to Figure 2 in the position in which the cam is shown in the operative position.

Figure 4 is a view of the pressure applying member in plan.

At 1 is represented a portion of the wheel hub upon which is provided a flange 2 in the form of a ring. To this ring is fixed by means of bolts such as 3 the brake drum 4 against which operate the brake segments 5, 6 when the brake is applied. When in the normal inoperative position of the brake segments 5, 6, these are maintained away from the drum 4 by means of tension springs in a manner generally known. Two of such springs are represented at 25 and 26 in Figures 2 and 3.

The brake segments 5, 6 are each mounted in such manner that they turn upon the common pivot pin 7 which is provided with a lubricator 8.

Between the two upper extremities of these brake segments, the cam 9 is mounted upon a pivot pin 10 which is provided with a lubricator 11. The pivot pins 7 and 10 are mounted upon the fixed plate 27 which serves as a cover to the drum 4.

The cam 9 is provided with a downward extension in the form of a ball or sphere 12, the cam thus constitutes a lever.

The ball or sphere 12 is disposed within a cup 13 which constitutes the pressure applying element. The cup 13 is integrally provided with a spindle 14 mounted within a supporting boss 15 which is provided with a lubricator 16 and the spindle 14 can be rotated by the action of a lever 17 integrally mounted thereon. Another supporting boss 23 is provided which completes the support of the spindle 14, the respective bosses 15 and 23 being secured to the front axle 24 by vertical supports 18, 19 which are secured in position by such means as screws and nuts 20, 21.

At 22 the steering pivot of the front wheel is mounted at the respective ends of the front axle 24, and by which the front wheels are thus mounted so as to be capable of changing their direction for steering.

In the construction of this mechanism it will be understood that the geometric axis of the pivot 22 should pass through the centre of the sphere 12 or at least approach this as much as possible in the disengaged position of the brake segments.

The cup 13 is provided of a geometric form such that when the cam is in the operative position, that is to say in the position of application of the brake, the angle of movement of the cam from the normal vertical position does not vary when the position of the wheels by reference to the axle is varied.

It will be seen from Figure 3 that when the cam is in the operative position, the part 12 has moved around the axis of the pin 10, and inasmuch as the hub 4 must be free to move upon an axis passing through the pivot pin 22, it is necessary to give to the cup 13 a curvature as illustrated in Figure 4, so that thus freedom of movement of the hub may be permitted when the brake segments may have been operated. By such means the brake segments are not affected by the movement of the wheel in steering when the brake segments are applied seeing that the part 12 is permitted a free movement around the axis of the pivot pin 22 in the cup 13.

The lever 17 operates by means of a pedal or of a lever by the driver in a manner such as is usual. This lever at the will of the driver causes the rotation of a spindle 14 and thus the operation of the cup 13 which presses the spherical part 12 and causes the cam 9 to turn. This latter causes the brake segments 5, 6 to be separated one from the other and to be applied against the inner surface of the brake drum 4 which produces the braking. On the brake pedal or lever being released the brake segments cease the braking operation by virtue of the springs 25, 26 by which the brake segments are restored to their normal position.

The elements of the mechanism can be varied in their form and disposition without departing from the essential feature of the invention.

I claim:

1. Mechanism for the operation of the brakes of the front wheels of motor vehicles of the kind described, consisting in combination of the wheel hub, brake segments mounted within the said hub, an operating lever disposed between the oppositely disposed ends of said brake segments, and a pressure applying element by which movement is imparted to the operating lever, said operating lever and pressure applying element being rotatable upon parallel axes, the said pressure applying element comprising a cup and the said operating lever having a downwardly extending spherical part for engaging in the said cup, substantially as described.

2. Mechanism for the operation of the brakes of the front wheels of motor vehicles of the kind described, consisting in combination of the wheel hub, brake segments mounted within the said hub, an operating lever disposed between the oppositely disposed ends of said brake segments, and a pressure applying element by which movement is imparted to the operating lever, said operating lever and pressure applying element being rotatable upon parallel axes, the said pressure applying lever comprising a cup and the said operating lever having a downwardly extending spherical part for engaging in the said cup, and the said cup having a curvature therein, substantially as described.

ARTURO ELIZALDE ROUVIER.